Patented Mar. 1, 1949

2,463,000

UNITED STATES PATENT OFFICE 2,463,000

PROCESS FOR THE PRODUCTION OF FURFURAL

Johan Waldemar Sevón, Kuusankoski, Finland

No Drawing. Application April 12, 1946, Serial No. 661,906. In Finland April 26, 1945

4 Claims. (Cl. 260—347)

It is a known fact that furfural may be produced by heating and distilling pentosans or material containing pentosans in acid solution. The preparation of furfural from sulfite waste liquor from the sulfite pulp process, and particularly such as is derived from the cook of spruce wood, does not, however, pay under normal circumstances, inasmuch as the pentosan content of the spent liquor is low and the amount of heat thus required to distill off the furfural is unprofitably large.

This problem may, however, be solved by the aid of the invention herein disclosed.

Briefly my process comprises freeing the fermented liquor (mash) obtained in the manufacture of sulfite alcohol (by fermentation of sulfite waste liquor) partly or entirely of its alkaline components before distilling the alcohol off therefrom, and simultaneously or in a separate step acidifying the liquor. It is then heated in an autoclave to a temperature suitable for the formation of furfural, for instance 150°–180° C. After this, the contents of the autoclave are allowed to expand and the vapors therefrom led, possibly after previous neutralization, to the rectifying tower for alcohol, distillation, in which the furfural may then be collected from the lower part of the tower together with the fusel oil. Such neutralization of acid vapors may be effected in any known manner such as described in German Patent No. 80,390.

The optimum length of time for the pressure treatment varies according to the temperature and the quality of the material treated and may be determined by experiment.

Practical trial of this process has shown that the amount of heat required for it does not exceed that necessary for the normal distillation of the fermented liquor. The only additional expense incurred in this process for the production of furfural is that for the chemicals necessary for removing alkaline matter and acidifying the liquor. This step may be accomplished in any known fashion, for instance by precipitating calcium by means of sulfuric acid, or by treating the liquor with a cation-exchanger (organolith). Substances of this last named class may suitably be prepared by polymerizing sulfite waste liquor.

What is claimed is:

1. Process of treating fermented sulfite liquor for simultaneous production of alcohol and furfural comprising removing alkaline ions from the fermented liquor by ion exchange, acidifying the alkali free liquor, heating the acidified liquor under pressure in an autoclave to a pentosan to furfural conversion temperature, expanding the vapors generated in the autoclave after releasing the pressure and condensing the vapors in a rectifying column to separate alcohol and furfural.

2. Process of treating fermented sulfite liquor for simultaneous production of alcohol and furfural comprising adding sulfuric acid to precipitate calcium and acidify the fermented liquor, heating under pressure in an autoclave to a pentosan to furfural conversion temperature, expanding the vapors generated in the autoclave after releasing the pressure and condensing the vapors in a rectifying column to separate alcohol and furfural.

3. Process of treating fermented sulfite liquor for simultaneous production of alcohol and furfural comprising acidifying the fermented liquor, heating under pressure in an autoclave to a temperature of 150 to 180° C., expanding and neutralizing the vapors generated in the autoclave after releasing the pressure, and condensing the vapors in a rectifying column to separate alcohol and furfural.

4. Process of treating fermented sulfite liquor for simultaneous production of alcohol and furfural comprising removing alkaline ions and acidifying the fermented sulfite liquor, heating the acidified liquor under pressure in an autoclave to a temperature in the range of 150 to 180° C. to convert the pentosans to furfural expanding the vapors generated in the autoclave after releasing the pressure and condensing the vapors in a rectifying column to separate alcohol and furfural.

JOHAN WALDEMAR SEVÓN.

REFERENCES CITED

The following references are of record in the file of this patent:

UNITED STATES PATENTS

| Number | Name | Date |
|---|---|---|
| 1,322,054 | Ricard | Nov. 18, 1919 |
| 1,946,667 | Blomquist et al. | Feb. 13, 1934 |
| 1,946,668 | Groth et al. | Feb. 13, 1934 |
| 2,293,724 | Faerber | Aug. 25, 1942 |